United States Patent
Seghi et al.

(10) Patent No.: US 9,759,363 B2
(45) Date of Patent: Sep. 12, 2017

(54) ROTATABLE JOINT

(71) Applicant: MANULI RUBBER INDUSTRIES S.P.A., Milan (IT)

(72) Inventors: Paolo Seghi, Milan (IT); Luca Bechis, Milan (IT)

(73) Assignee: MANULI HYDRAULICS ITALIA S.R.L., Milan (IT)

( * ) Notice: Subject to any disclaimer, the term of this patent is extended or adjusted under 35 U.S.C. 154(b) by 524 days.

(21) Appl. No.: 14/353,249

(22) PCT Filed: Oct. 19, 2012

(86) PCT No.: PCT/EP2012/070817
§ 371 (c)(1),
(2) Date: Apr. 21, 2014

(87) PCT Pub. No.: WO2013/057291
PCT Pub. Date: Apr. 25, 2013

(65) Prior Publication Data
US 2014/0346770 A1 Nov. 27, 2014

(30) Foreign Application Priority Data
Oct. 21, 2011 (EP) .................................... 11186234

(51) Int. Cl.
*F16L 27/08* (2006.01)
*F16L 19/025* (2006.01)
*F16L 33/30* (2006.01)

(52) U.S. Cl.
CPC ......... *F16L 27/0824* (2013.01); *F16L 19/025* (2013.01); *F16L 33/30* (2013.01)

(58) Field of Classification Search
CPC ... F16L 27/08; F16L 27/0804; F16L 27/0824; F16L 27/0828; F16L 27/0861;
(Continued)

(56) References Cited

U.S. PATENT DOCUMENTS

| 1,092,673 | A | * | 4/1914 | Stephens | ............... | A61M 39/26 251/149.1 |
| 2,111,956 | A | * | 3/1938 | Baldwin | ............... | F16L 37/092 220/240 |

(Continued)

FOREIGN PATENT DOCUMENTS

| CN | 2591377 Y | 12/2003 |
| CN | 201273418 Y | 7/2009 |
| GB | 29095 A | 0/1911 |

OTHER PUBLICATIONS

State Intellectual Property Office of the People's Republic of China Notification of First Office Action Application No. 201280551583.X Dated: Apr. 28, 2015 pp. 9.

(Continued)

*Primary Examiner* — Brian Glessner
*Assistant Examiner* — Adam Barlow
(74) *Attorney, Agent, or Firm* — St. Onge Steward Johnston & Reens, LLC

(57) ABSTRACT

A rotatable joint includes a body configured for connecting to an external system and provided with an internal hole arranged for being traversed by pressurised fluid, a tubular element on an end of which a hose can be inserted that is sealingly coupled with the joint and provided with a further through hole that defines, together with the internal hole, a longitudinal channel that extends parallel to a longitudinal axis within which the pressurised fluid flows. The joint further includes an annular closing element fixed to the tubular body by a threaded connection and a rotatable coupling arrangement that acts at least in a longitudinal direction to enable mutual rotation between the tubular element and the tubular body.

14 Claims, 3 Drawing Sheets

(58) Field of Classification Search
CPC ......... F16L 19/025; F16L 33/30; F16L 37/22; F16L 37/23
USPC .................................................. 285/276, 277
See application file for complete search history.

(56) References Cited

U.S. PATENT DOCUMENTS

| | | | | |
|---|---|---|---|---|
| 2,394,715 A * | 2/1946 | Phillips | ............... | F16L 27/0828 277/558 |
| 2,414,997 A * | 1/1947 | Atkins | ................ | F16L 27/0824 285/278 |
| 2,470,256 A * | 5/1949 | McIlroy | .................. | F16L 37/23 279/72 |
| 2,730,382 A * | 1/1956 | De Mastri | ............... | F16L 37/23 251/149.6 |
| 2,777,716 A * | 1/1957 | Gray | ................... | F16L 37/0841 251/149.6 |
| 2,817,543 A * | 12/1957 | Corsette | .............. | F16L 27/0824 285/181 |
| 2,843,401 A * | 7/1958 | Rogers | ................... | F16L 37/10 285/277 |
| 2,963,304 A * | 12/1960 | Comlossy, Jr. | ..... | F16L 27/0828 277/500 |
| 3,112,767 A * | 12/1963 | Cator | ...................... | F16L 37/23 137/614.06 |
| 3,517,952 A * | 6/1970 | McCracken | ........ | F16L 27/0824 277/500 |
| 6,308,734 B1 * | 10/2001 | Smith | .................. | B23Q 11/103 137/580 |
| 8,191,932 B2 * | 6/2012 | Davis | ...................... | F16L 37/23 137/614.05 |
| 2003/0156893 A1 * | 8/2003 | Takagi | .................. | F16L 27/023 403/128 |
| 2005/0205009 A1 * | 9/2005 | Ayers | .................. | F16L 27/0828 118/300 |
| 2013/0154254 A1 * | 6/2013 | Jenner | .................. | F16L 19/025 285/47 |
| 2014/0346770 A1 * | 11/2014 | Seghi | ................... | F16L 19/025 285/278 |

OTHER PUBLICATIONS

International Search Report and Written Opinion of the International Searching Authority Application No. PCT/EP2012/070817 Completed: Jan. 3, 2013; Mailing Date: Jan. 14, 2013 8 pages.

* cited by examiner

ROTATABLE JOINT

FIELD OF THE INVENTION

The invention relates to a rotatable joint for hydraulic connections. In particular, the invention relates to a rotatable joint provided with a tubular element at which the rotatable joint and a hose are connected.

BACKGROUND OF THE INVENTION

Specifically, but not exclusively, the invention can be advantageously used in a system for conveying pressurised fluid in the context of various hydraulic and/or industrial applications.

As shown in FIG. 1, the prior art comprises rotatable joints 100 formed by a first element 101, connected to an external system, and by a second element 102 to which a hose is fixed. These rotatable joints are those interposed, in use, between the hose and the external system to permit the relative rotation of the hose in relation to the external system.

The first element 101 comprises an end 101a connected to the external system and another end 101b, opposite the end 101a, comprising a threaded cylindrical portion 103 (male). The second element 102 comprises in turn a respective end 102a in which a threaded cylindrical internal cavity 104 (female) is defined which is arranged for being connected to the threaded cylindrical portion 103 of the first element 101, and an end 102b connected to the hose—opposite the end 102a. In use, screwing the second element 102 to the first element 101 is provided (as indicated schematically by the arrow F).

The first element 101 and the second element 102 further comprise respective internal holes that extend along the entire longitudinal extent thereof (defining in practice a single channel that extends axially over the entire joint) in such a manner that a pressurised fluid can traverse the rotatable joint from the external system to the hose, or vice versa.

The first element 101 is made in such a manner as to permit relative rotation between the threaded cylindrical portion 103 (and thus the second element 102 connected thereto) and the end 101a connected to the external system, such that the hose can rotate with respect to the external system to which it is connected by the joint.

A drawback of prior-art rotatable joints is that the pressurised fluid can exit the joint at the threaded connection between the first element 101 and the second element 102. This is very harmful, as these leaks of pressurised fluid to the outside pollute the surrounding environment and dirty the joint externally. Further, such leaks constitute a waste that causes an increase in costs.

Another drawback of known joints is the fact that the rotation movements of the hose in relation to the external system can cause accidental unscrewing of the second element 102 from the first element 101. This must be absolutely avoided because the sudden opening of the joint would cause a complete leakage of pressurised fluid with a consequent arrest of the flow of fluid into the system until the joint is restored.

A further drawback of known joints is the significant longitudinal dimension thereof, substantially determined by the sum of the longitudinal extents of the first element 101 and of the second element 102 (from which the longitudinal extent of the threaded cylindrical portion 103 is subtracted).

SUMMARY OF THE INVENTION

An object of the invention is to improve the rotatable joints of known type.

Another object of the invention is to provide a rotatable joint that enables leakages of pressurised fluid to the exterior to be significantly reduced or even eliminated.

An advantage of the invention is that of make available a reliable and safe rotatable joint. The joint according to the invention in fact enables leakages of pressurised fluid to the exterior to be limited significantly and undesired malfunctions of the joint to be avoided that are due to sudden decouplings between connected elements forming the joint. The joint according to the invention in fact enables the number of sealing surfaces to be reduced, with a consequent reduction in the number of zones of potential fluid leakage.

Another advantage of the invention is to make available a joint that ensures that the hose can rotate in relation to the external system also in the presence of very high fluid pressure, at the same time reducing friction.

Still another advantage is to make available a compact, light rotatable joint having overall dimensions, in particular in a longitudinal direction, that are less than known joints.

A further advantage is to make available a joint that is simpler and quicker to fit. Mounting the joint according to the invention requires no screwing operation, which is a delicate and laborious operation as it implies controlling the tightening torque and can therefore give rise to fluid leakages to the exterior of the joint if it is not performed correctly.

Another advantage is that of make available a joint that is well lubricated during operation and enables lubricant to be saved, which further reduces costs.

A still further advantage is that of providing a joint that is constructionally simple and cheap.

These objects and advantages and still others are all achieved by a joint made according to any one of the following claims.

BRIEF DESCRIPTION OF THE DRAWINGS

The invention can be better understood and implemented with reference to the attached drawing, which illustrates a non-limiting embodiment thereof.

DETAILED DESCRIPTION OF THE INVENTION

Figure 1:
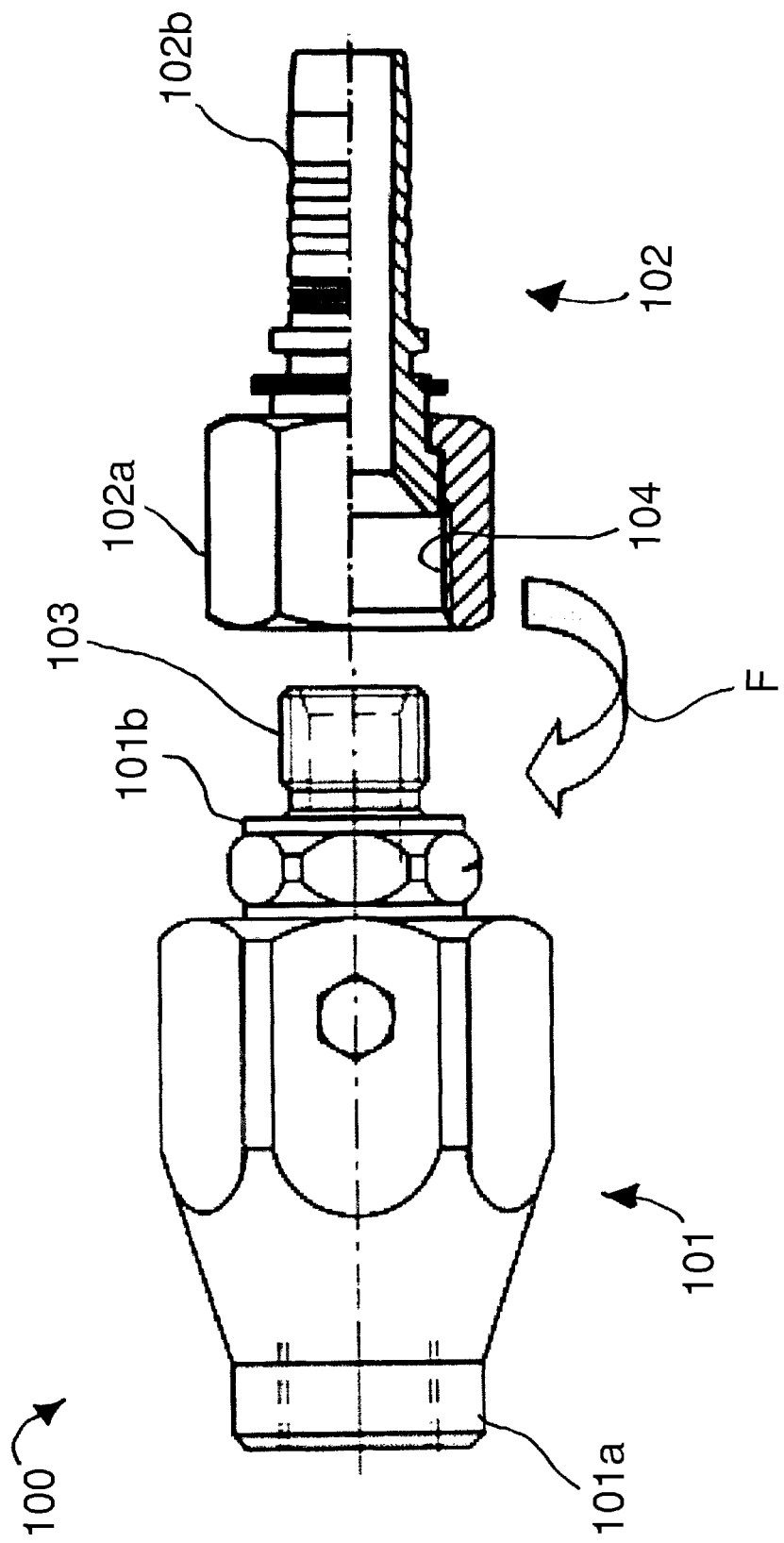
FIG. 1 shows a rotatable joint of known type.
Figure 2:
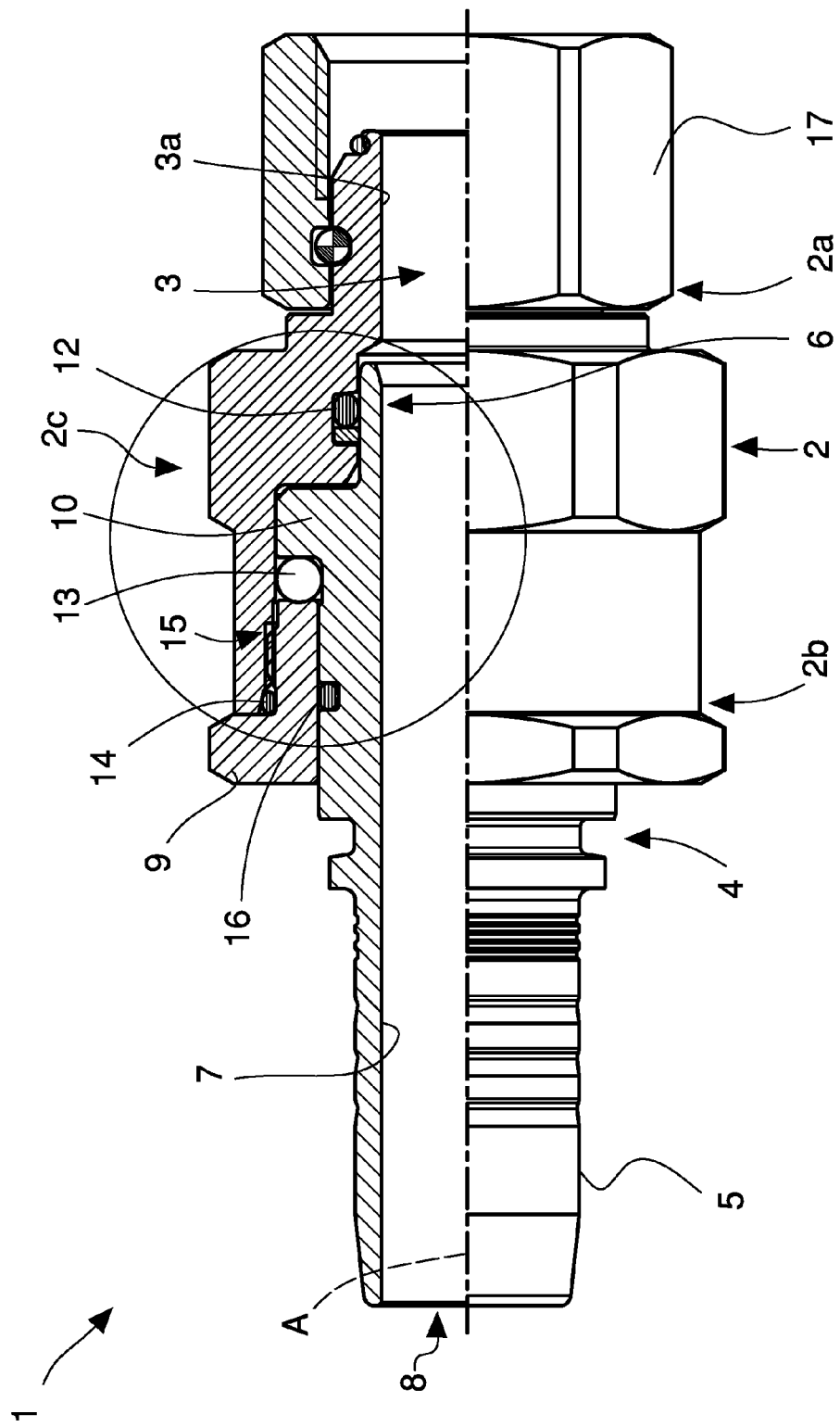
FIG. 2 is a side view, partially sectioned along a longitudinal section plane, of a rotatable joint according to the invention.
Figure 3:
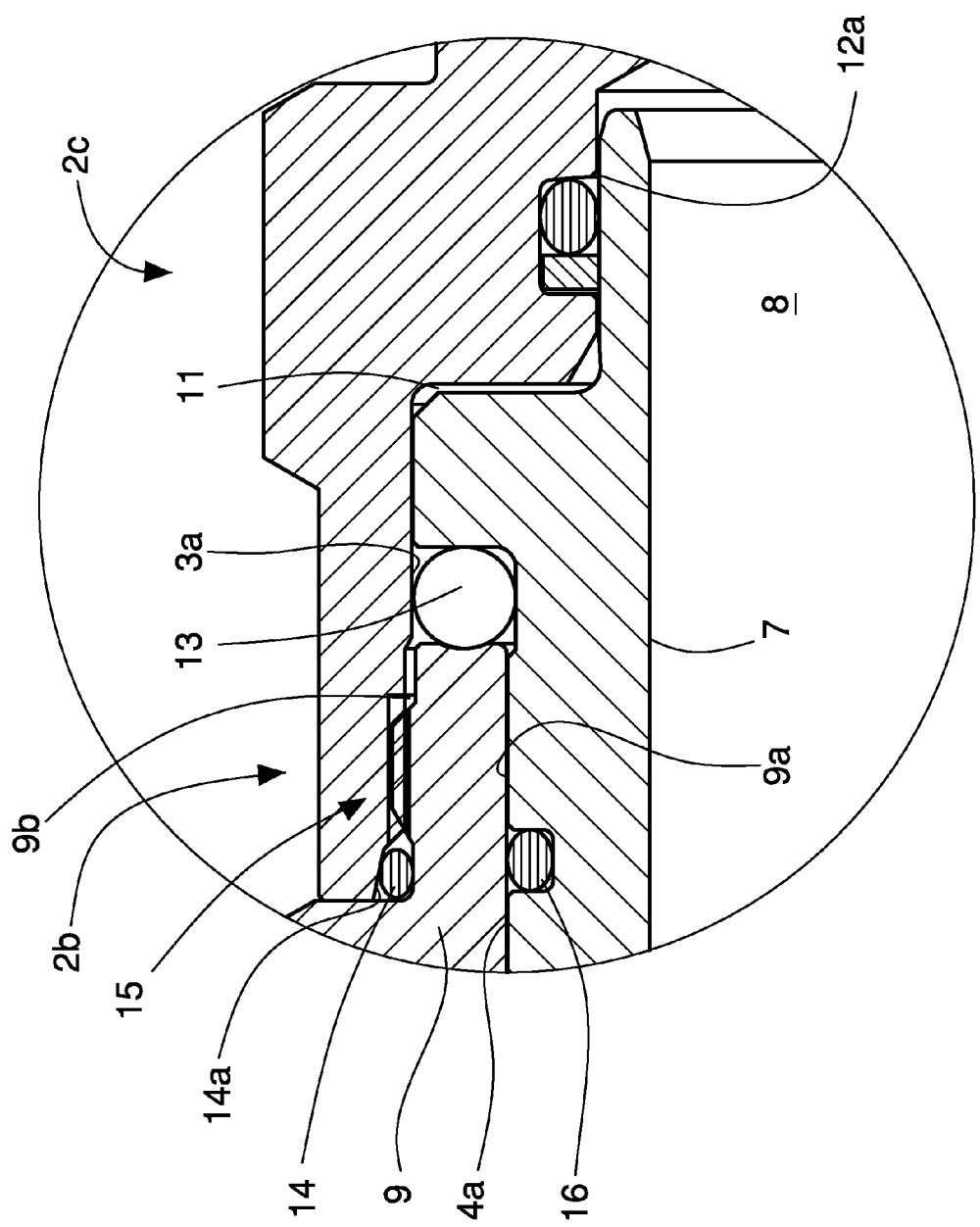
FIG. 3 shows an enlargement of a sectioned part of the joint of FIG. 2.

With reference to FIGS. 2 and 3, there is shown a joint 1 for hydraulic connections.

The joint 1 extends along a longitudinal axis A, optionally symmetrically around the axis A.

The joint 1 comprises a tubular body 2 provided with a first portion 2a in which there is defined-in an inner wall 3a of the tubular body 2—a cylindrical internal hole 3 arranged for being traversed by pressurised fluid.

The tubular body 2 further comprises a second portion 2b that is hollow such as to enclose internally, at least partially, a tubular element 4 and an annular closing element 9.

The tubular element 4 comprises an external wall 4a and is provided with a first end 5 and with a second end 6, opposite the first end 5. The first end 5 comprises a hose-holder appendage configured for being inserted inside a hose (which is not shown), which is sealingly coupled with this end generally by crimping methods of known type. The second end 6 on the other hand faces the internal hole 3 of the tubular body 2. Inside the tubular element 4 there is defined a further through hole 7 that connects the first end 5 to the second end 6. The further hole 7 can have a cylindrical cross section and have a diameter that is substantially the same as the diameter of the internal hole 3. As is clear from the FIG. 2, the tubular body 2 and the tubular element 4 are mutually arranged in such a manner that the internal hole 3 and the further hole 7 are traversed in sequence by the pressurised fluid. In other words, the further hole 7 defines, together with the internal hole 3, a longitudinal channel 8 that extends parallel to the longitudinal axis A and inside which the pressurised fluid flows that traverses the joint 1.

The annular closing element 9 has an abutting shoulder that abuts against the tubular body 2.

The tubular element 4 comprises a shoulder 10 that projects radially to a middle portion 2c of the tubular body 2 (interposed between portions 2a and 2b) in such a manner as to define, in cooperation with a portion of the inner wall 3a of the tubular body 2, a volume 11 that defines an axial clearance between the tubular element 4 and the tubular body 2, wherein an axial clearance is, by definition, a possible relative movement, in axial direction, between two elements (the tubular element 4 and the tubular body 2) from one end position to the opposite end position. The shoulder 10 has a surface that faces in an axial direction a surface of said portion of the inner wall 3a.

The joint 1 comprises a first sealing arrangement 12 interposed between the channel 8 and the volume 11 for preventing the passage of pressurised fluid to the latter. The first sealing arrangement 12 is housed in a first seat 12a made on the inner wall 3a of the tubular body 2 at the middle portion 2c of the tubular body 2 and at the second end 6 of the tubular element 4.

The joint 1 comprises a rotatable coupling arrangement 13 interposed between the annular closing element 9 and the tubular element 4 to act at least in a longitudinal direction (parallel to the axis A) such as to enable relative rotation therebetween. The rotatable coupling arrangement 13 is a rolling assembly that comprises a plurality of balls received in a housing that is radially interposed between the external wall 4a and the inner wall 3a and axially interposed between the shoulder 10 and the annular closing element 9 in such a manner as to permit rotation around the axis A of the tubular element 4, that is thus able to rotate in relation to the tubular body 2 and to the annular closing element 9. In order to ensure correct operation of the rotatable coupling arrangement 13, the plurality of balls is suitably lubricated by an operator before assembling of the joint 1, in particular by using a suitable highly viscous lubricant such as, for example, grease.

The balls can be made of the material commonly used for a rotatable coupling arrangement of known type, for example a C98 steel.

The balls and the surfaces contacted thereby can be subjected to suitable (known) heat treatments to improve the mechanical resistance thereof.

Alternatively, the housing surfaces contacted by the balls can comprise material with a low friction coefficient, such as, for example, PTFE.

The annular closing element 9 is interposed -in a radial direction with respect to said longitudinal axis (A)—between the external wall 4a of the tubular element 4 and the inner wall 3a of the tubular body 2 and is fixed to the inner wall 3a by a removable connection 15 of mechanical type, in particular by a threaded connection. The annular closing element 9 comprises an internal wall 9a (shaped as a rotating, for example cylindrical, surface) facing a portion of the external wall 4a, and a further wall 9b opposite the internal wall 9a and facing (and coupled by the connection 15) to the tubular body 2.

With the threaded connection 15 a second sealing arrangement 14 is associated, which is positioned in a seat 14a defined between the tubular body 2 and the annular closing element 9, and arranged for preventing the exit of pressurised fluid from the joint 1.

The threaded connection 15 consists of a thread made on the further wall 9b that is coupled on a further thread made on the inner wall 3a of the tubular body 2 in such a manner as to connect removably the annular closing element 9 and the tubular body 2.

The first sealing arrangement 12 and the second sealing arrangement 14 can be made in the form of washers of elasto-plastic material of known type.

The joint 1 comprises a protection arrangement 16, in particular shaped as a packing of known type, arranged between the external wall 4a and the wall 9a for preventing entry inside the joint 1 of elements coming from the external environment such as impurities or dirt. The protection arrangement 16 is received in a respective housing made in the external wall 4a.

The joint 1 comprises a connecting element 17, removably fixed-by a further threaded connection—to the first portion 2a of the tubular body 2. The connecting element 17 is arranged for connecting the joint 1 to the external system in such a manner as to be interchangeable with other connecting elements in order to enable the joint 1 to be connected to various external systems.

In use, the joint 1 is connected to the external system by the connecting element 17 and a hose is crimped on the first end 5 of the tubular element 4. Subsequently the joint 1 is traversed by pressurised fluid, which can also be at very high pressure, for example up to 350 bar.

The first sealing arrangement 12 prevents the pressurised fluid flowing inside the channel 8 from reaching the volume 11. If there is even a minimum leak of fluid to the volume 11, the exit of this fluid leaked to the outside of the joint 1 is nevertheless prevented by the presence of the second sealing arrangement 14.

Owing to the axial clearance defined by the volume 11 and to the rotatable coupling arrangement 13, the tubular element 4 can rotate around the axis A also in the presence of very high fluid pressures and simultaneously also a reduction of the friction between adjacent components due to the rotational movement is achieved. This also enables a significant amount of lubricant to be saved that is necessary for the periodical lubrication of the joint because, owing to the structure thereof, the contact zones between the tubular element 4 and the tubular body 2 are already suitably lubricated.

In one embodiment of the invention which is not shown, the connecting element 17 can be incorporated in the tubular body 2.

In another embodiment of the invention which is not shown, the first sealing arrangement 12 and the second sealing arrangement 14 can be arranged in positions that are different from those shown.

In a further embodiment of the invention the first seat 12a can be made on the external wall 4a rather than on the inner wall 3a, or partially in both walls.

Other versions and/or additions are also possible in addition to what has been disclosed above and/or shown in the attached drawings.

The invention claimed is:

1. A rotatable joint extending at least partially along a longitudinal axis comprising:
   a tubular body configured for connecting to an external system and provided with an internal hole arranged for being traversed by pressurised fluid;
   a tubular element having a first end and a second end opposite said first end and facing said internal hole; said first end comprising a hose-holder appendage that is able to be inserted in use inside a hose hermetically coupled with said joint; said tubular element having in its interior a further through hole that defines, together with said internal hole, a longitudinal channel that extends parallel to said longitudinal axis and is arranged for being traversed by said pressurised fluid;
   wherein the joint further comprises:
      an annular closing element interposed in a radial direction in relation to said longitudinal axis between an external wall of said tubular element and an inner wall of said tubular body and fixed to said inner wall by a removable connection of mechanical type; and
      a rotatable coupling arrangement interposed between said annular closing element and said tubular element to act at least in a longitudinal direction such as to enable mutual rotation between the latter;
      wherein said tubular element comprises a shoulder that projects radially to said tubular body so as to identify, in cooperation with a portion of said inner wall, a volume that defines an axial free play between said tubular element and said tubular body.

2. The joint according to claim 1, wherein said shoulder has a surface that faces in an axial direction a surface of said portion of said inner wall.

3. The joint according to claim 1, wherein said rotatable coupling arrangement is housed radially between said external wall and said inner wall and axially between said shoulder and said annular closing element.

4. The joint according to claim 1, wherein said tubular body comprises a first portion defining said internal hole, and a second hollow portion such as to enclose internally, at least partially, said tubular element and said annular closing element.

5. The joint according to claim 4, wherein a first sealing arrangement interposed between said channel and said volume is provided for preventing the flow of fluid, and operating on a middle portion of said tubular body interposed between said portions.

6. The joint according to claim 1, wherein said rotatable coupling arrangement is a rolling assembly comprising a plurality of balls.

7. The joint according to claim 6, wherein said balls are interposed radially between said external wall and said inner wall in such a manner as to enable said tubular element to rotate around said axis, tubular element which is thus able to rotate in relation to said tubular body and to said annular closing element.

8. The joint according to claim 1, wherein a second sealing arrangement is associated with said removable connection of mechanical type, said second sealing arrangement being positioned in a seat defined between said tubular body and said annular closing element, and being arranged to prevent the pressurised fluid from exiting said joint.

9. The joint according to claim 1, wherein said annular closing element comprises a wall shaped as a rotating surface which faces a portion of said external wall.

10. The joint according to claim 9, wherein said annular closing element comprises a further wall opposite said wall and facing—and coupled by said connection—said tubular body.

11. The joint according to claim 10, wherein said connection of mechanical type is made on said further wall and on said second portion of said tubular body in such a manner as to removably connect them one another.

12. The joint according to claim 9, comprising a protection arrangement arranged between said external wall and said wall to prevent the entry inside said joint of elements coming from the external environment such as impurities or dirt.

13. The joint according to claim 1, wherein said connection of mechanical type is a threaded connection.

14. The joint according to claim 1, wherein said annular closing element has an abutting shoulder that abuts against said tubular body.

* * * * *